United States Patent
Ooishi

(10) Patent No.: US 9,967,419 B2
(45) Date of Patent: May 8, 2018

(54) IMAGE READING APPARATUS AND IMAGE FORMING SYSTEM

(71) Applicant: Konica Minolta, Inc., Tokyo (JP)

(72) Inventor: Akihiko Ooishi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 199 days.

(21) Appl. No.: 15/188,309

(22) Filed: Jun. 21, 2016

(65) Prior Publication Data

US 2016/0373603 A1  Dec. 22, 2016

(30) Foreign Application Priority Data

Jun. 22, 2015  (JP) .................... 2015-124599

(51) Int. Cl.

| | |
|---|---|
| G06F 15/00 | (2006.01) |
| H04N 1/00 | (2006.01) |
| H04N 1/60 | (2006.01) |
| H04N 1/48 | (2006.01) |
| G03G 21/20 | (2006.01) |

(52) U.S. Cl.
CPC ....... H04N 1/00984 (2013.01); H04N 1/6041 (2013.01); H04N 1/6091 (2013.01); G03G 21/20 (2013.01); H04N 1/48 (2013.01); H04N 1/6097 (2013.01)

(58) Field of Classification Search
CPC . H04N 1/00984; H04N 1/6041; H04N 1/6091
USPC ....................................................... 358/504
See application file for complete search history.

(56) References Cited

U.S. PATENT DOCUMENTS

| | | | | |
|---|---|---|---|---|
| 7,269,374 B2* | 9/2007 | Oka | ..................... | G03G 21/206 399/92 |
| 9,843,696 B2* | 12/2017 | Yanagawa | .......... | H04N 1/00978 |
| 2006/0177232 A1* | 8/2006 | Ehara | ................. | G03G 15/2039 399/44 |
| 2009/0147286 A1* | 6/2009 | Yano | .................. | H04N 1/00002 358/1.9 |
| 2013/0107332 A1* | 5/2013 | Tang | .................. | H04N 1/00909 358/483 |

FOREIGN PATENT DOCUMENTS

| | | |
|---|---|---|
| JP | 2001016373 A | 1/2001 |
| JP | 2011097348 A | 5/2011 |

* cited by examiner

*Primary Examiner* — Mark R Milia
(74) *Attorney, Agent, or Firm* — Lucas & Mercanti, LLP

(57) ABSTRACT

An image reading apparatus capable of detecting correct color tones of an image printed on a sheet is described. The image reading apparatus includes a scanner 100, a colorimeter 103, a cooling device 145, a temperature control unit 111, and an image correction unit 113. While an image correction process is not performed, the temperature control unit 111 controls the cooling temperature to a first temperature for shifting the cooling device 145 to a predetermined cooled state. While the image correction process is performed, the temperature control unit 111 controls the cooling temperature to a second temperature for making the temperature of the sheet uniform. The image correction unit 113 obtains, while the temperature control unit 111 controls the cooling temperature to the second temperature, the correction amount of the image based on the colorimetric measurement result of the colorimeter 103 and the reading result of the scanner 100.

14 Claims, 13 Drawing Sheets

FIG. 3
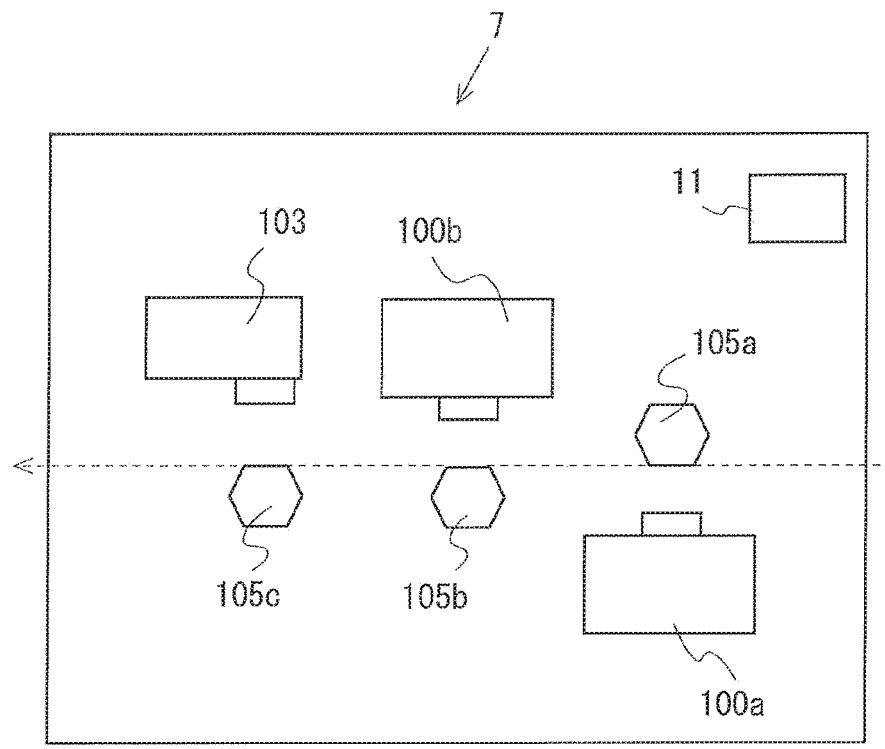
FIG. 4
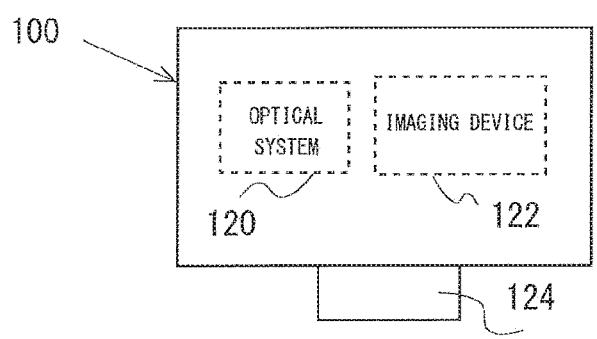
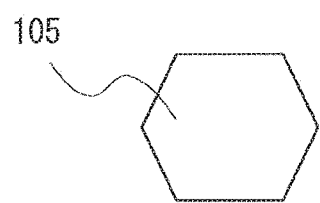

IMAGE READING APPARATUS AND IMAGE FORMING SYSTEM

CROSS-REFERENCE TO RELATED APPLICATIONS

The present application claims priority under 35 U.S.C. § 119 to Japanese Patent Application No. 2015-124599, filed Jun. 22, 2015. The contents of this application are herein incorporated by reference in their entirety.

BACKGROUND OF THE INVENTION

Field of the Invention

The present invention relates to an image reading apparatus and an image forming system.

Description of Related Art

Heretofore, an image forming system consisting of an electrophotographic image forming apparatus and an image reading apparatus has been used. The image forming apparatus is capable of successively printing images on sheets. The image reading apparatus is capable of reading an image printed on a sheet and performing various types of processes. The image reading apparatus reads an image on a sheet by the use of a scanner which reads the image by irradiating the sheet with light which is emitted from a point light source.

The scanner is provided with a control board which controls an LED element used as a point light source. However, since the control board can be a heat generation source, the light emitted from the LED element may have an unstable luminance. The control board is thereby provided with a heat sink through which heat of the control board is released. Furthermore, as illustrated for example in Japanese Patent Published Application No. 2001-16373, a heat sink is cooled by a fan to effectively dissipate heat from the heat sink and stabilize the luminance of the LED element. The heat generation source can thereby be continuously cooled to inhibit the illumination variation of the LED element and stabilize the luminance.

Incidentally, another image reading apparatus is proposed which can eliminate unevenness of the temperature among a plurality of light sources by providing each light source with a thermoelectric device which cools the light source (for example, refer to Japanese Patent Published Application No. 2011-97348).

However, in the case of the technique described in Japanese Patent Published Application No. 2001-16373, while cooling the point light source, a cooling air can enter a route of conveying a sheet. If a cooling air enters a route of conveying a sheet, there may be caused imbalance of the surface temperature of a sheet in the form of a temperature gradient. In the case where a temperature gradient is formed on a sheet, a scanner may fail to correctly detect a color tone of an image printed on the sheet because of thermochromism which changes a color tone due to a change in temperature.

On the other hand, in the case of the technique described in Japanese Patent Published Application No. 2011-97348, a temperature gradient on a sheet is not taken into consideration so that it is not assumed that cooling heat is transferred to a sheet from each light source.

Accordingly, in the case of the prior art techniques described in Japanese Patent Published Application No. 2001-16373 and Japanese Patent Published Application No. 2011-97348, even if a scanner reads an image, there is the fear that correct color tones can not be detected from an image printed on a sheet due to thermochromism.

The present invention is made in order to solve such a prior art problem and it is an object of the present invention to provide an image reading apparatus and an image forming system capable of detecting correct color tones of an image printed on a sheet.

SUMMARY OF THE INVENTION

To achieve at least one of the above-mentioned objects, reflecting one aspect of the present invention, an image reading apparatus comprises: a scanner structured to read a sheet on which an image is printed; a colorimeter located in a downstream side of the scanner and structured to colorimetrically measure the sheet; a cooling device structured to cool the scanner; a temperature control unit structured to control a cooling temperature of the cooling device to a target temperature; and an image correction unit structured to perform an image correction process for obtaining a correction amount of the image printed on the sheet, wherein the temperature control unit is structured to control, while the image correction process is not performed, the cooling temperature to a first temperature which is a target value of the cooling temperature for shifting the cooling device to a predetermined cooled state, and control, while the image correction process is performed, the cooling temperature to a second temperature which is a target value of the cooling temperature for making the temperature of the sheet uniform, and wherein the image correction unit is structured to obtain, while the temperature control unit controls the cooling temperature to the second temperature, the correction amount of the image based on the colorimetric measurement result of the colorimeter and the reading result of the scanner.

In accordance with the image reading apparatus of the present invention, it is preferred that when a predetermined threshold number of sheets are printed during performing the image correction process, the temperature control unit controls the cooling temperature to the second temperature.

Also, in accordance with the image reading apparatus of the present invention, it is preferred that the cooling device is provided with a fan which controls a blowing amount of air, and that the temperature control unit controls the blowing amount of air to a first blowing amount for controlling the cooling temperature to the first temperature and controls the blowing amount of air to a second blowing amount which is smaller than the first blowing amount for controlling the cooling temperature to the second temperature.

Furthermore, in accordance with the image reading apparatus of the present invention, it is preferred that when controlling the cooling temperature to the second temperature, the temperature control unit uses a first timing to start the controlling and a second timing to terminate the controlling, and that the temperature control unit controls the blowing amount of air to the second blowing amount in a temperature uniformizing processing time from the first timing to the second timing around a colorimetrically measurement timing of the colorimeter.

Still further, in accordance with the image reading apparatus of the present invention, it is preferred that a temperature detection sensor structured to detect a temperature of the sheet is further provided, that when the temperature detected by the temperature detection sensor reaches the second temperature with the first timing, the temperature control unit maintains the current cooling temperature, and that when the temperature detected by the temperature detection sensor does not reach the second temperature after elapsing the temperature uniformizing processing time, the temperature control unit delays the second timing.

Still further, in accordance with the image reading apparatus of the present invention, it is preferred that the scanner comprises: an imaging device structured to image the sheet along the width direction of the sheet; a point light source structured to irradiate the sheet with light when the imaging device images the sheet; a control board structured to control a light quantity of light emitted from the point light source; and a heat sink arranged on the control board and structured to release heat generated by the control board, that the cooling device supplies air to the heat sink, that when controlling the cooling temperature to the first temperature, the temperature control unit increases a rotational speed of the fan to a first rotational speed, and that when controlling the cooling temperature to the second temperature, the temperature control unit decreases the rotational speed of the fan to a second rotational speed which is lower than the first rotational speed.

Still further, in accordance with the image reading apparatus of the present invention, it is preferred that when a sheet having a paper density larger than a predetermined threshold value is passed while the image correction process is not performed, the temperature control unit increases the rotational speed of the fan to a third rotational speed which is higher than the first rotational speed.

Still further, in accordance with the image reading apparatus of the present invention, it is preferred that when a sheet coated with a coating material is passed while the image correction process is not performed, the temperature control unit increases the rotational speed of the fan to a third rotational speed which is higher than the first rotational speed.

Still further, in accordance with the image reading apparatus of the present invention, it is preferred that when a sheet having a water content larger than a predetermined threshold value is passed while the image correction process is not performed, the temperature control unit increases the rotational speed of the fan to a third rotational speed which is higher than the first rotational speed.

Still further, in accordance with the image reading apparatus of the present invention, it is preferred that a duct structured to lead the air to the heat sink is further provided.

Still further, in accordance with the image reading apparatus of the present invention, it is preferred that a blocking member is further provided between the fan and the heat sink to cover the periphery of the heat sink and block heat from being transmitted to the sheet.

Still further, in accordance with the image reading apparatus of the present invention, it is preferred that the blowing amount is controlled to the first blowing amount in a stepwise manner or a continuous manner, and that the blowing amount is controlled to the second blowing amount by halting the rotation of the fans.

Still further, in accordance with the image reading apparatus of the present invention, it is preferred that the scanner comprises: an imaging device structured to image the sheet along the width direction of the sheet; a point light source structured to irradiate the sheet with light when the imaging device images the sheet; a control board structured to control a light quantity of light emitted from the point light source; and a heat sink arranged on the control board and structured to release heat generated by the control board, that the scanner further comprises a conduit for passing the heat medium which consists of a coolant or water, that the cooling device comprises a pump for circulating the heat medium, and that the temperature control unit has the pump control a flow rate of the heat medium and control the temperature of the heat medium to a target temperature.

BRIEF DESCRIPTION OF THE DRAWINGS

FIG. 3 is a view for showing an example of the configuration of an image reading apparatus 7.

FIG. 4 is a view for showing an example of the configuration of a scanner 100.

DETAILED DESCRIPTION OF THE PREFERRED EMBODIMENT

In what follows, several embodiments of the present invention will be explained with reference to drawings. However, the present invention is not limited to the following specific embodiments.

Embodiment 1

Figure 1:
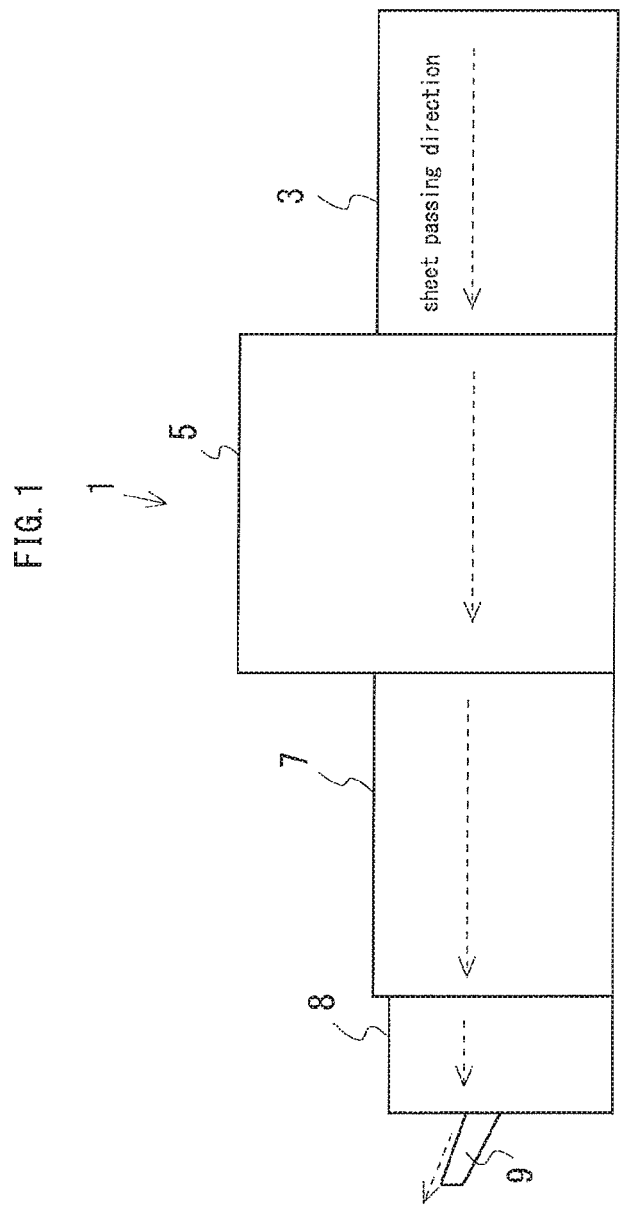
FIG. 1 is a schematic diagram for showing the overall configuration of an image forming system 1 in accordance with an embodiment 1.

FIG. 1 is a schematic diagram for showing the overall configuration of an image forming system 1 in accordance with an embodiment 1. As illustrated in FIG. 1, the image forming system 1 includes a paper feed apparatus 3, an image forming apparatus 5, an image reading apparatus 7 and a discharge unit 8. The paper feed apparatus 3 is responsible for feeding a sheet P to the image forming apparatus 5. The image forming apparatus 5 is responsible for forming an image on a sheet P fed by the paper feed apparatus 3, i.e., printing the image on the sheet P. The image reading apparatus 7 is responsible for reading a sheet P on which an image is printed by the image forming apparatus 5, and performing various types of processing. The discharge unit 8 is provided with a catch tray 9, and discharges a sheet P, which is conveyed from the image reading apparatus 7, to the catch tray 9.

Figure 2:
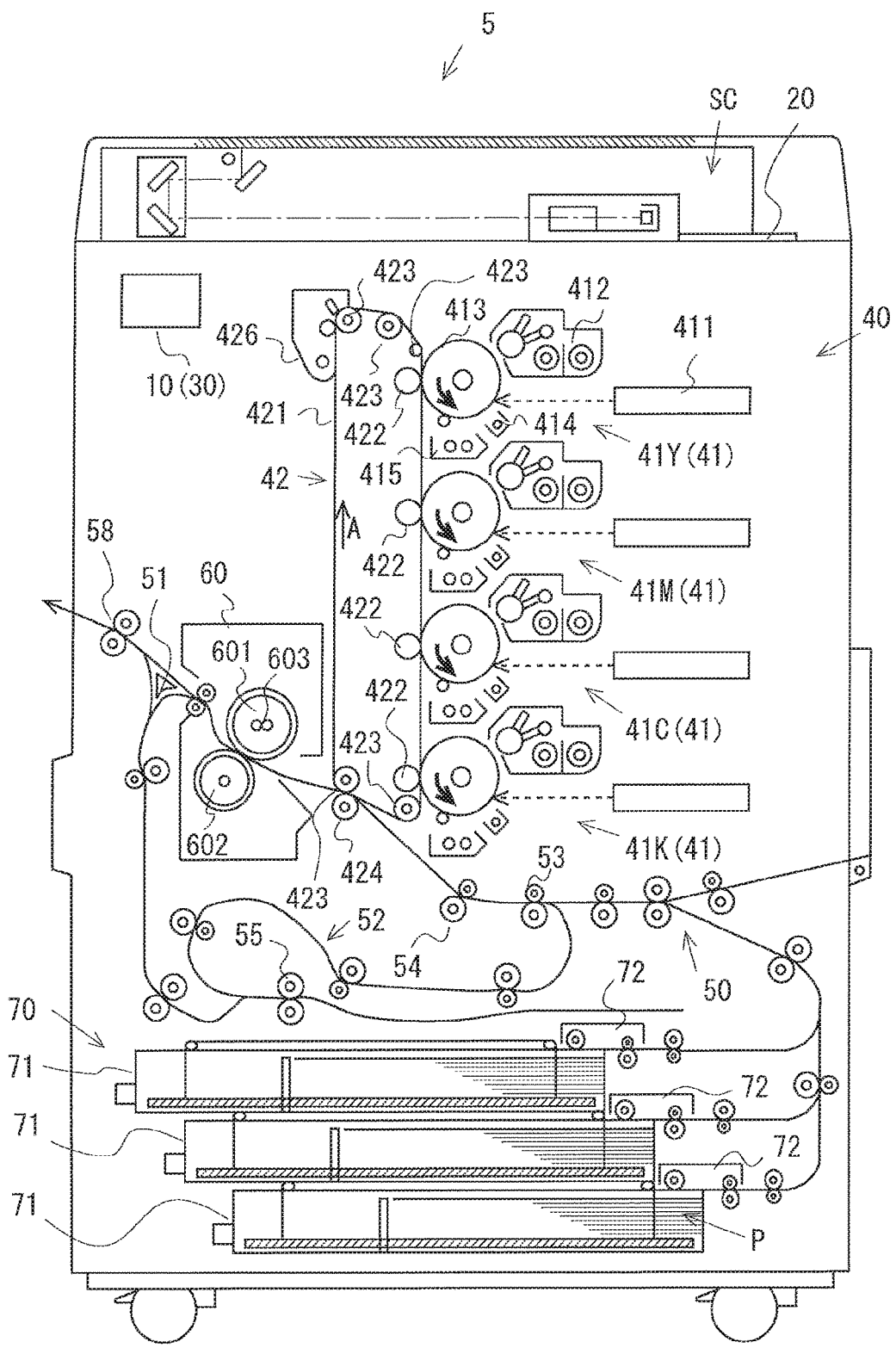
FIG. 2 is a diagram for showing an example of the configuration of an image forming apparatus 5.

Next, the image forming apparatus 5 will be specifically explained. FIG. 2 is a diagram for showing an example of the configuration of the image forming apparatus 5. As illustrated in FIG. 2, the image forming apparatus 5 is an intermediate transfer type color image forming apparatus which makes use of an electrophotographic process technique. The image forming apparatus 5 includes photoreceptor drums 413 which are serially arranged in the running direction (vertical direction) of an intermediate transfer belt 421 in correspondence with four colors, i.e., Y (yellow), M (magenta), C (cyan) and K (black). The image forming apparatus 5 is based on a vertical tandem system which successively transfers a toner image of each color onto the intermediate transfer belt 421.

Namely, the image forming apparatus 5 transfers toner images of respective colors, i.e., Y, M, C and K formed on the photoreceptor drums 413 respectively to the intermediate transfer belt 421. After superimposing four color toner images on the intermediate transfer belt 421, the image forming apparatus 5 forms an image on a sheet P by transferring the superimposed toner images.

The image forming apparatus 5 includes an original reading unit SC, an operation display 20, an image forming unit 40, a conveying route 50, a fixing unit 60, a control unit 10 and so forth. Also, the control unit 10 is provided with an image processing unit 30 and so forth.

The control unit 10 mainly consists of a CPU, a ROM, a RAM, and an I/O interface. The CPU reads various programs from the ROM or another storage unit in accordance with required processes, loads the programs on the RAM, and executes the programs to control the operations of the respective units of the image forming apparatus 5, the original reading unit SC, the operation display 20 and the like.

In other words, the control unit 10 is responsible for controlling the operation of the image forming apparatus 5 and implemented with a microcomputer which mainly consists of the CPU, the ROM, the RAM, and the I/O interface. The control unit 10 executes a predetermined control program to realize necessary functions including the image processing unit 30.

The operation display 20 is implemented with a liquid crystal display (LCD) incorporating a touch panel, and serves as a display unit and an operation unit which are not shown in the figure.

The display unit is responsible for displaying various operation control views, the operational state of each function and so forth based on a display control signal which is input from the control unit 10. The operation unit is provided with a numerical keypad, a start key and other various operational keys. After receiving various input signals from a user, the operation unit outputs operation signals to the control unit 10. A user can perform image quality settings by operating the operation display 20. Also, a user can perform various settings relating to image formation such as magnification settings, optional settings, output settings, paper settings and so forth by operating the operation display 20.

Furthermore, a user can instruct paper conveyance by operating the operation display 20.

For example, the paper conveying unit 70 conveys a sheet P along the conveying route 50 of the sheet P. Sheets P are stored in paper feed trays 71, extracted by paper feed units 72 and transferred to the conveying route 50.

The conveying route 50 is provided with a plurality of conveyance roller pairs including an intermediate conveyance roller pair, a loop roller pair 53 and a paper stop roller pair 54. The conveying route 50 conveys a sheet P fed by the paper feed unit 72 through the image forming unit 40, the fixing unit 60 and a discharging roller pair 58 in this order.

The original reading unit SC scans and exposes the image of an original with an optical system of a scanning exposing device, and reads the reflected light therefrom with a line image sensor to obtain image signals. The image signals are processed by performing A/D conversion, shading compensation, data compression and so on, and then input to the control unit 10 as read data of images. Incidentally, the image data input to the control unit 10 is not limited to the image data as captured by the original reading unit SC, but can be the data for example as received from another image forming apparatus, a personal computer or the like connected to the image forming apparatus 5, or stored in a portable recording medium such as a semiconductor memory.

The image processing unit 30 performs digital image processes with the input image data based on initial settings or user settings. The image processing unit 30 performs gradation level adjustment, for example, with reference to gradation level adjustment data in the form of a gradation level adjustment table. The image processing unit 30 also performs other processes with the input image data such as color correction, shading compensation and other various correction processes, or compression processes. The image forming unit 40 is controlled based on the image data processed by these processes.

The image forming unit 40 is provided with image forming units 41, an intermediate transfer unit 42 and the like for forming an image based on the image data obtained by various processes performed by the image processing unit 30 with colored toners corresponding to Y component, M component, C component and K component respectively, and transfers the toner image to a sheet P.

The image forming units 41 include four image forming units 41Y, 41M, 41C and 41K corresponding to Y component, M component, C component and K component respectively. The image forming units 41Y, 41M, 41C and 41K have the similar constituent elements respectively so that similar elements are denoted by like references and redundant description is not repeated. For example, in FIG. 2, while references are given only to the constituent elements of the image forming unit 41Y for Y component, references are dispensed with for the constituent elements of the other image forming units 41M, 41C and 41K respectively.

The image forming unit 41 is provided with an exposing device 411, a development apparatus 412, a photoreceptor drum 413, a charging unit 414, a drum cleaning unit 415 and the like.

The photoreceptor drum 413 consists, for example, of a conductive cylinder (aluminum blank tube) on which an under coat layer (UCL), a charge generation layer (CGL), and a charge transport layer (CTL) are successively stacked as a negative electrification type organic photo-conductor (OPC).

The charge generation layer is made of an organic semiconductor consisting of a resin binder (for example, polycarbonate) in which a charge generating material (for example, phthalocyanine pigment) is dispersed to generate electron-hole pairs in response to exposure by the exposing device 411.

The charge transport layer is made of an organic semiconductor consisting of a resin binder (for example, polycarbonate) in which a hole transporting material (for example, electron-donating nitrogen-containing compound) is dispersed to transport positive charge generated in the charge generation layer to the surface of the charge transport layer.

The charging unit 414 consists, for example, of a corona discharge generator such as a scorotron charging unit, a corotron charging unit or the like. The charging unit 414 uniformly charges the surface of the photoreceptor drum 413 with negative charge by corona discharge.

The exposing device 411 irradiates the photoreceptor drum 413 with light corresponding to an image of each color component. The surface charge (negative charge) of the photoreceptor drum 413 is neutralized by positive charge which is generated in the charge generation layer of the photoreceptor drum 413 and transported to the surface of the charge transport layer. By this configuration, an electrostatic latent image of each color component is formed on the surface of the photoreceptor drum 413 corresponding to the differential potential from the periphery.

The development apparatus 412 stores a developer for each color component (for example, two-component developer consisting of a toner and a magnetic carrier). The development apparatus 412 forms a toner image by attaching a toner of each color component to the surface of the photoreceptor drum 413 to visualize the electrostatic latent image. Specifically, a developing bias voltage is applied to a developer carrier (developing roller) to have the charged toner on the developer carrier be transferred and attached to the exposure area of the surface of the photoreceptor drum 413 due to the differential potential between the photoreceptor drum 413 and the developer carrier.

The drum cleaning unit 415 has a drum cleaning blade, which is in a slidably contact with the surface of the photoreceptor drum 413, and the like. The drum cleaning unit 415 removes residual transfer toner which remains on the surface of the photoreceptor drum 413 after the first transfer process.

The intermediate transfer unit 42 is provided with the intermediate transfer belt 421, first transfer rollers 422, a plurality of support rollers 423, a second transfer roller 424, and a belt cleaning unit 426 and so forth.

The intermediate transfer belt 421 is an endless belt which is wound around the plurality of support rollers 423 in the form of a loop. At least one of the plurality of support rollers 423 consists of a drive roller, and the others consist of non-driven rollers respectively. For example, preferably, the support roller 423 located in the downstream side of the first transfer rollers 422 for K component in the belt running direction is preferably implemented as the drive roller in this case. When the drive roller rotates, the intermediate transfer belt 421 runs at a constant speed in the direction indicated with arrow A.

The first transfer rollers 422 are arranged in the inner surface side of the intermediate transfer belt 421 and opposed to the photoreceptor drums 413 through the intermediate transfer belt 421 in correspondence with the color components respectively. First transfer nip portions are thereby formed by urging the first transfer rollers 422 against the photoreceptor drums 413 respectively with the intermediate transfer belt 421 therebetween for transferring the toner images from the photoreceptor drums 413 to the intermediate transfer belt 421.

The second transfer roller 424 is located in the outer surface side of the intermediate transfer belt 421 and opposed to one of the plurality of support rollers 423. The support roller 423 located opposite the intermediate transfer belt 421 is called a backup roller. A second transfer nip portion is formed by urging the second transfer roller 424 against the backup roller with the intermediate transfer belt 421 therebetween for transferring the toner images from the intermediate transfer belt 421 to a sheet P.

When the intermediate transfer belt 421 is passed through the first transfer nip portions, toner images are successively transferred from the photoreceptor drums 413 and superimposed on the intermediate transfer belt 421 respectively as a first transfer process. More specifically, a first transfer bias voltage is applied to the first transfer rollers 422 in order to charge the rear surface (which contacts the first transfer rollers 422) of the intermediate transfer belt 421 with electricity of the polarity opposite to that of toner so that the toner images are electrostatically transferred to the intermediate transfer belt 421.

The superimposed toner image on the intermediate transfer belt 421 is then transferred to a sheet P which is passed through the second transfer nip portion as a second transfer process. More specifically, a second transfer bias voltage is applied to the second transfer roller 424 in order to charge the back side of the sheet P, i.e. the side which contacts the second transfer roller 424, with electricity of the polarity opposite to that of toner so that the superimposed toner image is electrostatically transferred to the sheet P. The sheet P with the transferred toner image is conveyed to the fixing unit 60.

The belt cleaning unit 426 includes a belt cleaning blade, which is in slidable contact with the surface of the intermediate transfer belt 421, and so forth. The belt cleaning unit 426 removes toner which remains on the surface of the intermediate transfer belt 421 after the second transfer process.

Meanwhile, in the intermediate transfer unit 42, the function of the second transfer roller 424 can be implemented by an alternative structure, i.e., a so-called belt-type second transfer unit, consisting of a second transfer belt (not shown in the figure) which is wound around a plurality of support rollers 423 including the roller 424 in the form of a loop.

The fixing unit 60 is provided with a fixing roller 601, a pressure roller 602, a heating unit 603 and the like to fix a toner image transferred by the image forming unit 40 to a sheet P. Specifically, the fixing unit 60 forms a fixing nip between the fixing roller 601 and the pressure roller 602 which are urged against each other. In the fixing unit 60, the heating unit 603 heats the fixing roller 601. The fixing unit 60 fixes an image to a sheet P under the pressure applied by the pressure roller 602 and the heat applied through the fixing roller 601. After the fixing unit 60 processes the sheet P by the fixing treatment, the sheet P is discharged outwards by discharging rollers 58.

In the case where an image is to be formed also on the back side of a sheet P, the sheet P with the image formed on the front side is conveyed to a refeed conveying route 52 through a switching gate 51. The refeed conveying route 52 includes reversing rollers 55 which hold the tail end of the conveyed sheet P and then sends back the sheet P to reverse the front and back sides of the sheet P. After reversing the front and back sides, the sheet P is conveyed by a plurality of conveyance rollers and joined with a conveying route 50 in the upstream side of the transfer site for the purpose of supplying the sheet P to form an image on the other side.

Next, the image reading apparatus 7 will be specifically explained. FIG. 3 is a view for showing an example of the configuration of the image reading apparatus 7. The image reading apparatus 7 is arranged in the downstream side of the image forming apparatus 5 and responsible for reading an image printed on one or both side of a sheet P. The image forming apparatus 5 obtains a correction amount of an image printed on the sheet P based on the reading results such as the color, position and magnification factor of the image, and feeds back the correction amount of the image to the image forming apparatus 5.

The image reading apparatus 7 is provided with a control unit 11, a scanner 100a, a scanner 100b, a colorimeter 103, calibration members 105a to 105c and a paper path 500. The paper path 500 is a path through which a sheet P supplied from the image forming apparatus 5 is passed.

For example, receiving a sheet P supplied from the image forming apparatus 5, the image reading apparatus 7 has the scanner 100a, the scanner 100b or the colorimeter 103 detect the image formed on the sheet P. The result of detecting the image is output to the control unit 11 of the image reading apparatus 7.

The control unit 11 is responsible for controlling the image reading apparatus 7 and can be implemented with a microcomputer consisting mainly of a CPU, a ROM, a RAM, and an I/O interface. As specifically described below, the control unit 11 performs various processes based on the result of detecting the image, and transmits the results of the processes to the control unit 10 of the image forming apparatus 5.

The scanner 100a and the scanner 100b are arranged to face a sheet P which is passed through the paper path 500 and read an image printed on the sheet P. The scanner 100a is responsible for reading the back side of a sheet P, and the reading result is used, for example, to check misalignment between images printed on the front and back sides of the sheet P, and the existence of an extraordinary image or the like. On the other hand, the scanner 100b is responsible for reading the front side of a sheet P, i.e., performing reading operation of an image printed on the sheet P such as patches which is not shown in the figure. Incidentally, the scanner 100a and the scanner 100b are referred to simply as the scanner 100 when they need not be distinguished.

Incidentally, the image reading apparatus 7 is configured to operate as either an in-line system or an offline system.

The in-line system provides a configuration in which the image reading apparatus 7 is directly fed with a sheet P which is supplied from the image forming apparatus 5 and on which an image is formed. On the other hand, the offline system provides a configuration in which the image reading apparatus 7 is not directly fed with a sheet P which is supplied from the image forming apparatus 5 and on which an image is formed, but the image forming apparatus 5 and the image reading apparatus 7 are designed independently from each other. The following explanation is based on the assumption that an in-line system is used. However, an offline system can be used instead.

The scanner 100 will be specifically explained. FIG. 4 is a view for showing an example of the configuration of the scanner 100. The scanner 100 is provided in the upstream side of the colorimeter 103, and consists of a lighting system 124 for irradiating a sheet P which is passed through a reading position, and a line image sensor consisting of a plurality of imaging devices 122 which are linearly arranged in the sheet width direction to photoelectrically convert light reflected from the sheet P in correspondence with picture elements respectively. The reading area of the scanner 100 is determined to cover the maximum width of sheets P which can be transferred from the image forming apparatus 5. The scanner 100 reads the image formed on a sheet as a two-dimensional image P by repeating operation of reading image data from one line along the sheet width direction in synchronization with the operation of conveying the sheet P which is passed through the reading position. The image, which is read, is used as read image data.

The imaging device 122 is implemented as CCDs (Charge Coupled Device). The CCDs serve as an optical sensor which reads an image on a sheet P in a reading position, and arranged in a line to be capable of reading the entire width of the sheet P as a color line sensor.

When performing a reading operation, the scanner 100 has the imaging device 122, the optical system 120 and the lighting system 124 irradiating the reading position cooperate with each other. The optical system 120 serves to lead an image in a reading position to the CCDs, and is provided with a plurality of mirrors and a plurality of lenses.

Namely, the scanner 100 is provided with a line image sensor for reading a sheet P along the width direction of the sheet P, and capable of acquiring an image of the whole surface of a sheet P by reading each line corresponding to the lateral width of the sheet P in the passing direction of the sheet P.

Incidentally, the calibration member 105 is arranged to face the scanner 100, and used when reflecting light which is radiated to a sheet P.

The colorimeter 103 is arranged to face a sheet P passing along the paper path 500 in the downstream side of the scanner 100. For example, the colorimeter 103 guarantees the absolute value of the color of an image formed on a sheet P by colorimetrically measuring patches printed on the sheet P.

Specifically, the colorimeter 103 radiates visible light to the patches from a visible light source which is not shown in the figure, and acquires an optical spectrum of the reflected visible light. The color tones of the patches are derived by performing operations in a predetermined color model based on the optical spectrum acquired by the colorimeter 103.

The colorimetric result of the patches is generated as numeric data, i.e., colorimetric values, represented in a predetermined color model such as Lab color space or XYZ color space, and output to the control unit 10 or the control unit 11.

Incidentally, the colorimetric range, i.e., the viewing angle of the colorimeter 103 is narrower than the reading area of the scanner 100, and set to be narrower than the width of the patches in the sheet width direction. Specifically, a lens section which receives the light reflected from the patches has, for example, a diameter of about 4 mm.

Since colorimetric measurement is performed within a limited range of viewing angle in this manner, the colorimeter 103 can generate the color information with higher accuracy than the scanner 100. Because of this, when a sheet P is passed only once through the paper path 500, only one array of patches can be colorimetrically measured.

Figure 5:
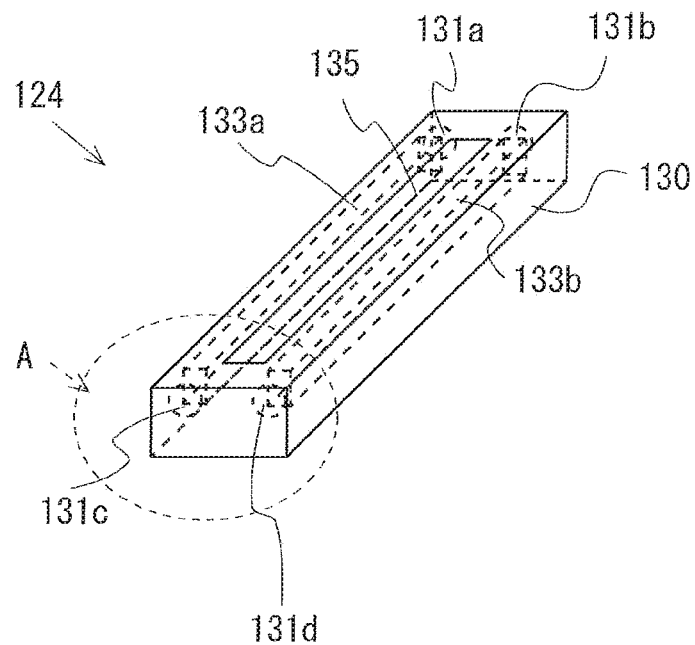
FIG. 5 is a view for showing an example of the configuration of a lighting system 124.

Next, the lighting system 124 will be specifically explained. FIG. 5 is a view for showing an example of the configuration of the lighting system 124. As illustrated in FIG. 5, the lighting system 124 includes point light sources 131a to 131d, a light guide member 133a and a light guide member 133b which are fixed by a support member 130. The support member 130 is formed with a central opening 135 in the longitudinal direction.

The light guide member 133a and the light guide member 133b serve to lead light and are arranged in the both sides of the opening 135. The point light source 131a and the point light source 131c are arranged at the both ends of the light guide member 133a respectively. The point light source 131b and the point light source 131d are arranged at the both ends of the light guide member 133b respectively.

The light emitted from the point light sources 131a to 131d is radiated along the width direction of a sheet P through the light guide member 133a and the light guide member 133b to enable line irradiation of a sheet P in the main scanning direction. After the line irradiation, the opening 135 lead the reflected light to the CCDs.

Incidentally, the point light sources 131a to 131d are referred to simply as the point light source 131 when they need not be distinguished. Also, the light guide member 133a and the light guide member 133b are referred to simply as the light guide member 133 when they need not be distinguished.

Figure 6:
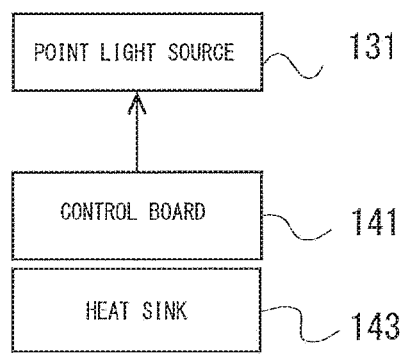
FIG. 6 is a view for schematically showing an example of the configuration of portion A shown in FIG. 5.
Figure 7:
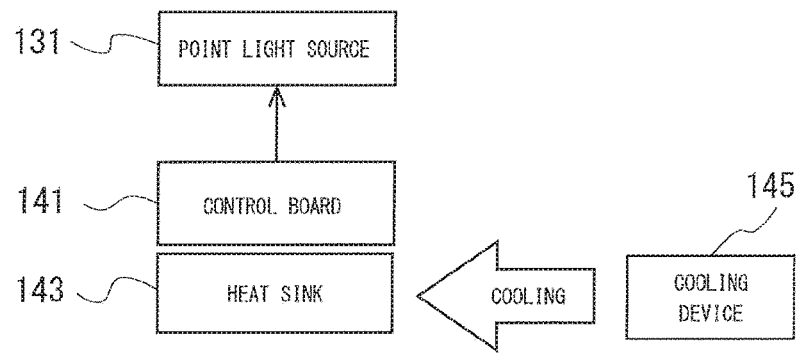
FIG. 7 is a schematic view for showing the situation in which a heat sink 143 is cooled by a cooling device 145.

Next, the heat generation source in the lighting system 124 will be explained. FIG. 6 is a view for schematically showing an example of the configuration of portion A shown in FIG. 5. FIG. 7 is a schematic view for showing a heat sink 143 cooled by a cooling device 145.

As illustrated in FIG. 6, the light quantity of light emitted from the point light source 131 is controlled by a control board 141. The control board 141 consists of a power semiconductor device and the like, and generates heat when controlling the light quantity of light emitted from the point light source 131. The control board 141 is provided with the heat sink 143. The heat sink 143 releases heat generated by the control board 141. The heat generated by the control board 141 makes the luminance of the point light source 131 unstable, so that luminance variation cannot be inhibited.

Because of this, as illustrated in FIG. 7, the cooling device 145 is used. The cooling device 145 is responsible for cooling the scanner 100, more specifically speaking, cooling the heat sink 143. The control board 141 can thereby be continuously cooled to inhibit luminance variation and stabilize the luminance of light emitted from the point light source 131.

Figure 8:
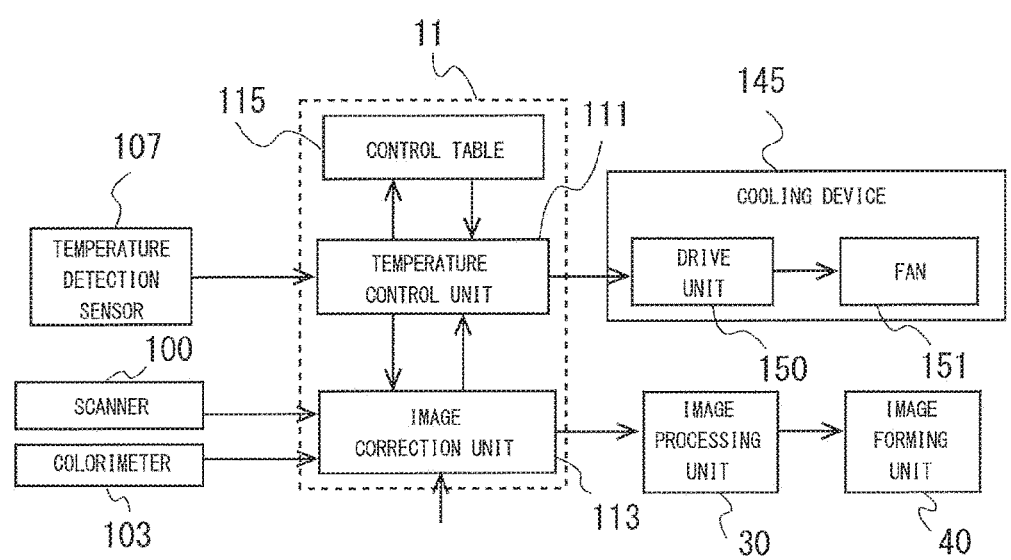
FIG. 8 is a block diagram for showing an example of the functional structure of a control unit 11 and the cooling device 145.

Next, the control unit 11 will be specifically explained. FIG. 8 is a block diagram for showing an example of the functional structure of the control unit 11 and the cooling device 145. The control unit 11 runs a predetermined control program to implement functions including a temperature control unit 111 and an image correction unit 113 and data structure relating to a control table 115 as illustrated in FIG. 8.

The temperature control unit 111 controls a cooling temperature of the cooling device 145 to a target temperature. Specifically, in the case where an image correction process for obtaining the correction amount of an image printed on a sheet P is not performed, the temperature control unit 111 controls the cooling temperature to a first temperature, as one of target temperatures, which is the target value of the cooling temperature for shifting the cooling device 145 to a predetermined cooled state. On the other hand, in the case where an image correction process for obtaining the correction amount of an image printed on a sheet P is performed, the temperature control unit 111 controls the cooling temperature to a second temperature, as one of the target temperatures, which is the target value of the cooling temperature for shifting the sheet P to a uniform temperature state. Incidentally, after printing a predetermined threshold number of sheets P, the temperature control unit 111 controls the cooling temperature to the second temperature during performing the image correction process.

The cooling device 145 is provided with a drive unit 150 and fans 151. The drive unit 150 controls the rotational speed of the fans 151 to rotate or stop the fans 151. The fan 151 controls the blowing amount of air.

When controlling the cooling temperature to the first temperature, the temperature control unit 111 controls the blowing amount of air to a first blowing amount. On the other hand, when controlling the cooling temperature to the second temperature, the temperature control unit 111 controls the blowing amount of air to a second blowing amount which is smaller than the first blowing amount. A first blowing amount setting includes controlling the rotational speed of the fans 151 in a stepwise manner or a continuous manner. A second blowing amount setting includes halting the rotation of the fans 151. That is, the temperature control unit 111 may control the fan 151 to halt and the rotational speed of the fan 151 to be zero in order to control the cooling temperature to the second temperature.

Figure 9:
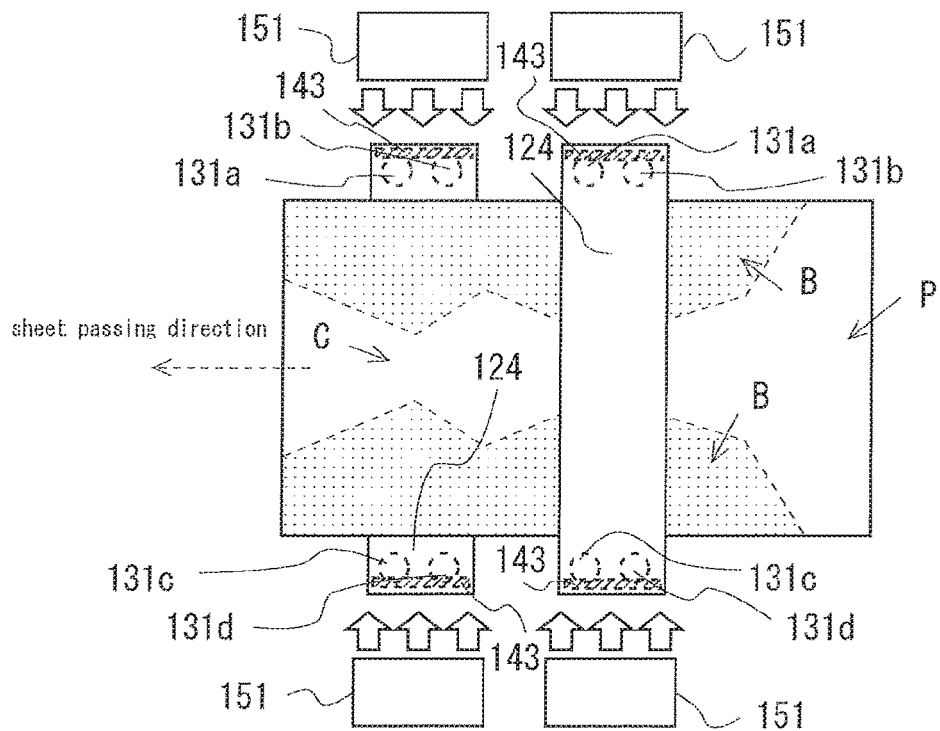
FIG. 9 is a view for schematically showing the situation in which the temperature distribution of a sheet P becomes uneven due to the rotation of fans 151.

Next is description of the situation that, while the fan 151 is rotating, a cooling air enters the paper path 500. FIG. 9 is a view for schematically showing the situation in which the temperature distribution of a sheet P becomes uneven due to the rotation of fans 151.

When the fans 151 are rotating, as illustrated in FIG. 9, air produced by the fans 151 blows on a sheet P so that there is an unevenness in the temperature distribution of the surface of the sheet P between edge areas B and a center area C in the form of a temperature gradient. The temperature gradient occurring in a sheet P causes thermochromism which varies color tones depending upon the temperature so that the color tones cannot correctly be detected.

Figure 10:
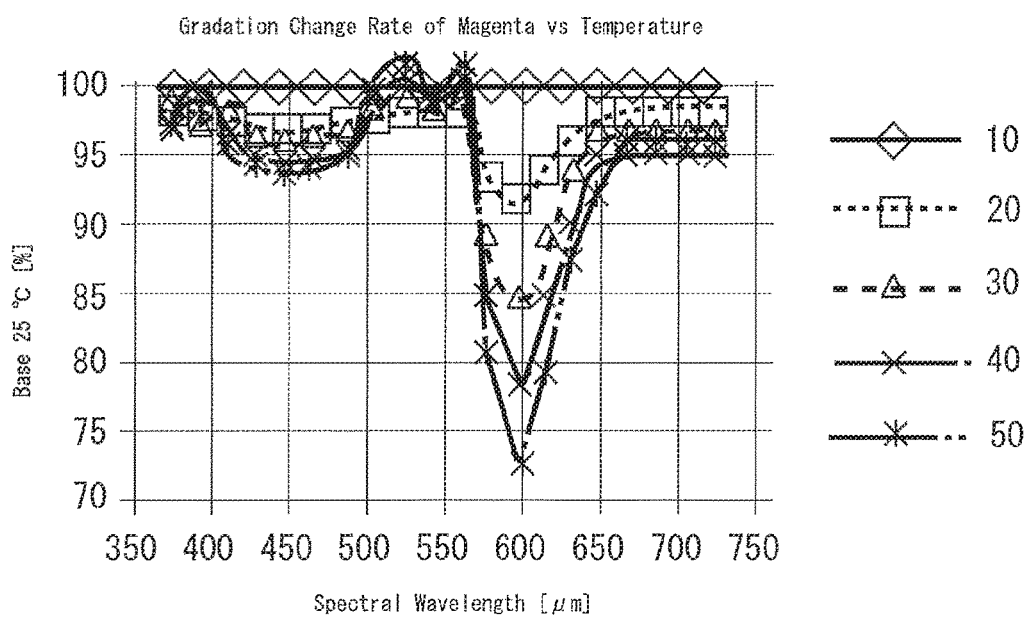
FIG. 10 is a view for explaining an example of change in color tone due to thermochromism.

The gradation change rate of magenta will be explained as an example. FIG. 10 is a view for explaining an example of change in color tone due to thermochromism. As illustrated in FIG. 10, the gradation change rate varies in accordance with the temperature. Specifically, the gradation change rate increases as the temperature increases. Accordingly, if there is a temperature gradient, color tones cannot be correctly detected.

Meanwhile, when sheets P are successively printed as a continuous paper passing print operation, the image correction process is intermittently performed by the colorimeter 103 between various printing jobs, and color correction information is fed back to the image processing side. Correct color tones are thereby detected by controlling the cooling device 145 in synchronization with a colorimetrically measurement timing D of the colorimeter 103.

Figure 11:
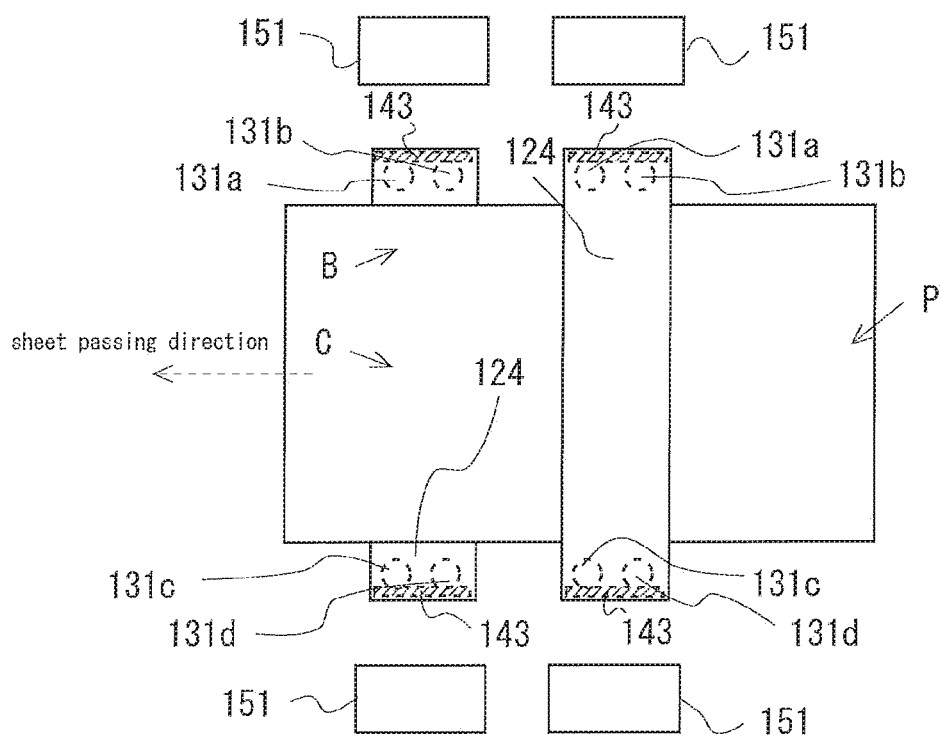
FIG. 11 is a view for schematically showing the situation in which the temperature distribution of a sheet P becomes uniform by halting the fans 151.

Detection of correct color tones will be explained below. FIG. 11 is a view for schematically showing the situation in which the temperature distribution of the sheet P becomes uniform by halting the fans 151. The blowing amount setting of halting the rotation of the fans 151 is included in the second blowing amount setting. The blowing amount of the fans 151 is controlled to the second blowing amount by controlling the cooling temperature to the second temperature. Air is thereby not supplied to a sheet P from the fans 151 so that the temperature gradient between the edge areas B and the center area C of the sheet P disappears due to thermal dissipation.

Figure 12:
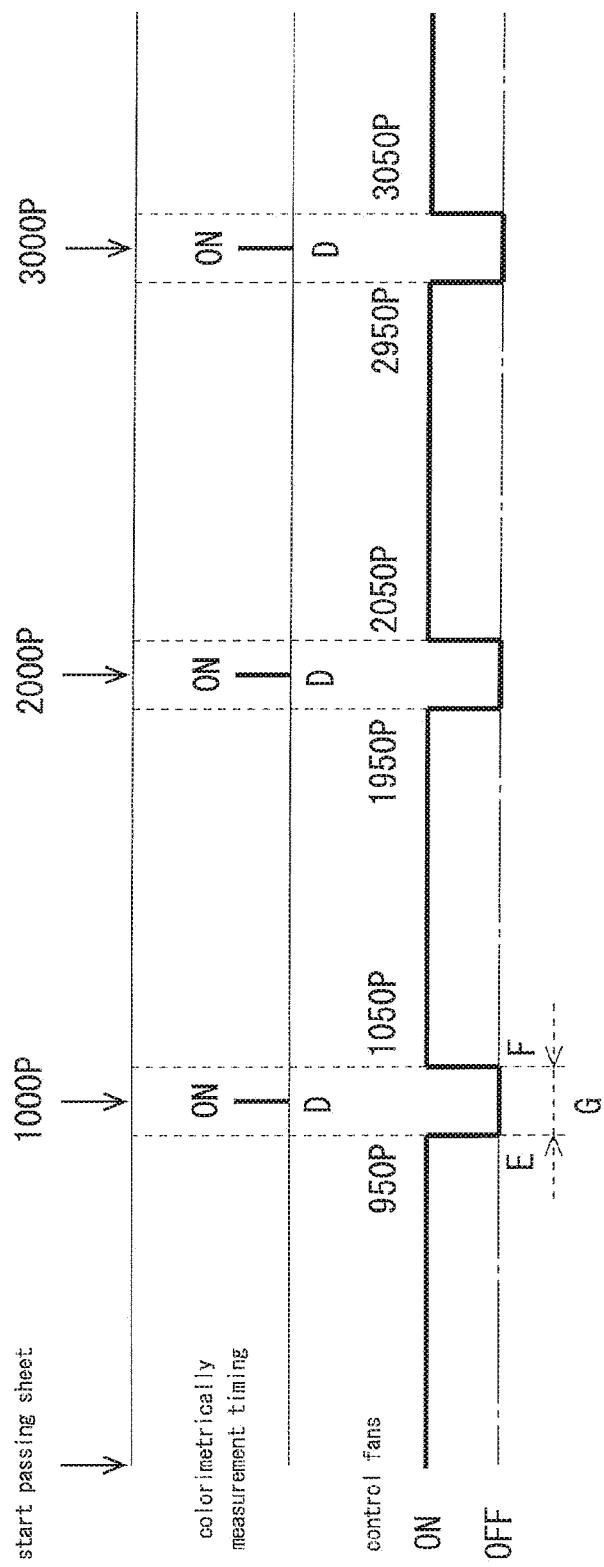
FIG. 12 is a timing chart for explaining various control timings when performing the image correction process.

Next, the timing of controlling the fans 151 will be explained. FIG. 12 is a timing chart for explaining various control timings when performing the image correction process. As illustrated in FIG. 12, when controlling the cooling temperature to the second temperature, the temperature control unit 111 uses a first timing E to start the controlling and a second timing F to terminate the controlling. The temperature control unit 111 controls the blowing amount of air to the second blowing amount in a temperature uniformizing processing time G from a first timing E to a second timing F around the colorimetrically measurement timing D of the colorimeter 103.

Specifically, in the case where a color correction reading operation is performed after printing each 1000 sheets during a continuous paper passing print operation of 5000 sheets, the fan 151 is controlled to control the blowing amount of the air to the second blowing amount while printing 50 sheets just before the colorimetrically measurement timing D and 50 sheets just after the colorimetrically measurement timing D. For example, the temperature control unit 111 halts the rotation of the fan 151 as the second blowing amount setting. Alternatively, the second blowing amount may be the blowing amount of a gentle breeze which does not cause a temperature gradient in a sheet P, without halting the rotation of the fan 151.

The transmission of the detection result of a temperature detection sensor 107 of FIG. 8 to the temperature control unit 111 will be explained. The temperature detection sensor 107 detects the temperature of a sheet P and transmits the detection result to the temperature control unit 111. When the temperature detected by the temperature detection sensor 107 reaches the second temperature with the first timing E, the temperature control unit 111 maintains the current cooling temperature. When the temperature detected by the temperature detection sensor 107 does not reach the second temperature after elapsing the temperature uniformizing processing time G, the temperature control unit 111 delays the second timing F.

Meanwhile, although not shown in the figure, the temperature detection sensor 107 may be of any configuration as long as it can measure temperatures at least in two locations, i.e., the edge areas B of a sheet P and the center area C of the sheet P. For example, the temperature detection sensor 107 may consist of a first infrared sensor which is located above the edge areas B of a sheet P and consists of detecting infrared light radiated from the edge areas B of the sheet P, and a second infrared sensor which is located above the center area C of the sheet P and consists of detecting infrared light radiated from the center area C of the sheet P.

Also, the temperature control unit 111 increases the rotational speed of the fan 151 to the first rotational speed to control the cooling temperature to the first temperature, and decreases the rotational speed of the fan 151 to the second rotational speed to control the cooling temperature to the second temperature. Meanwhile, when the rotation of the fan 151 is halted, the temperature control unit 111 sets the second rotational speed to zero.

Furthermore, when a sheet P having a paper density larger than a predetermined threshold value is passed while the image correction process is not performed, the temperature control unit 111 increases the rotational speed of the fan 151 to a third rotational speed which is higher than the first rotational speed.

Still further, when a sheet P coated with a coating material is passed while the image correction process is not performed, the temperature control unit 111 increases the rotational speed of the fan 151 to a third rotational speed which is higher than the first rotational speed.

Still further, when a sheet P having a water content larger than a predetermined threshold value is passed while the image correction process is not performed, the temperature control unit 111 increases the rotational speed of the fan 151 to a third rotational speed which is higher than the first rotational speed.

Incidentally, the first blowing amount setting, the second blowing amount setting and the like as described above are stored in the control table 115.

The image correction unit 113 of FIG. 8 is responsible for obtaining the correction amount of an image printed on a sheet P. Specifically, when the temperature control unit 111 controls the cooling temperature to the second temperature, the image correction unit 113 obtains the correction amount of an image based on the colorimetric measurement result of the colorimeter 103 and the reading result of the scanner 100. Specifically, the image correction unit 113 corrects the color information of patches read by the scanner 100 based on the colorimetric values of the patches colorimetrically measured by the colorimeter 103.

More specifically, the image correction unit 113 associates the colorimetric values of the patches colorimetrically measured by the colorimeter 103 with the color information of the patches read by the scanner 100. Since the colorimetric values of the patches and the color information of the patches are associated with each other, the colorimetrically measurement result of the colorimeter 103 can be reflected in the reading result of the scanner 100 to obtain an accurate correction amount.

The image processing unit 30 optimizes images to be formed by the image forming unit 40 based on the correction amount calculated by the image correction unit 113. The process of optimizing images to be performed by the image processing unit 30 includes positional adjustment of images to be printed on the front and back sides of a sheet P, adjustment of densities, adjustment of color tones and so forth.

Figure 13:
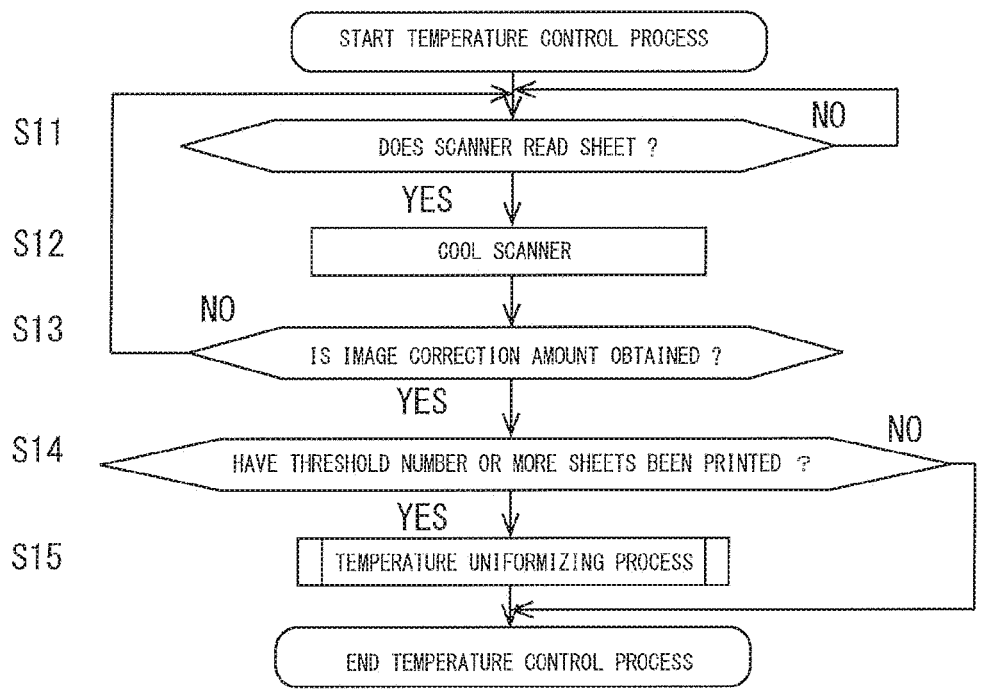
FIG. 13 is a flow chart for showing a temperature control process.

Next, an example of controlling the image reading apparatus 7 will be explained. FIG. 13 is a flow chart for showing a temperature control process.

In step S11, the image correction unit 113 determines whether or not the scanner 100 reads a sheet P. If the scanner 100 reads a sheet P (step S11: YES), the process proceeds to step S12. Conversely, if the scanner 100 does not read a sheet P (step S11: NO), the process is returned to step S11.

In step S12, the temperature control unit 111 cools the scanner 100. Specifically, the temperature control unit 111 increases the rotational speed of the fans 151 to the first rotational speed to control the cooling temperature to the first temperature.

In step S13, the image correction unit 113 determines whether to obtain the correction amount of images. If the correction amount of images is obtained (step S13: YES), the process proceeds to step S14. Conversely, the correction amount of images is not obtained (step S13: YES), the process is returned to step S11.

In step S14, the image correction unit 113 determines whether or not a threshold number of sheets P or more sheets P have been printed. If the threshold number of sheets P or more sheets P have been printed (step S14: YES), the process proceeds to step S15. Conversely, if the threshold number of sheets P or more sheets P have not been printed yet (step S14: NO), the temperature control process is finished.

Figure 14:
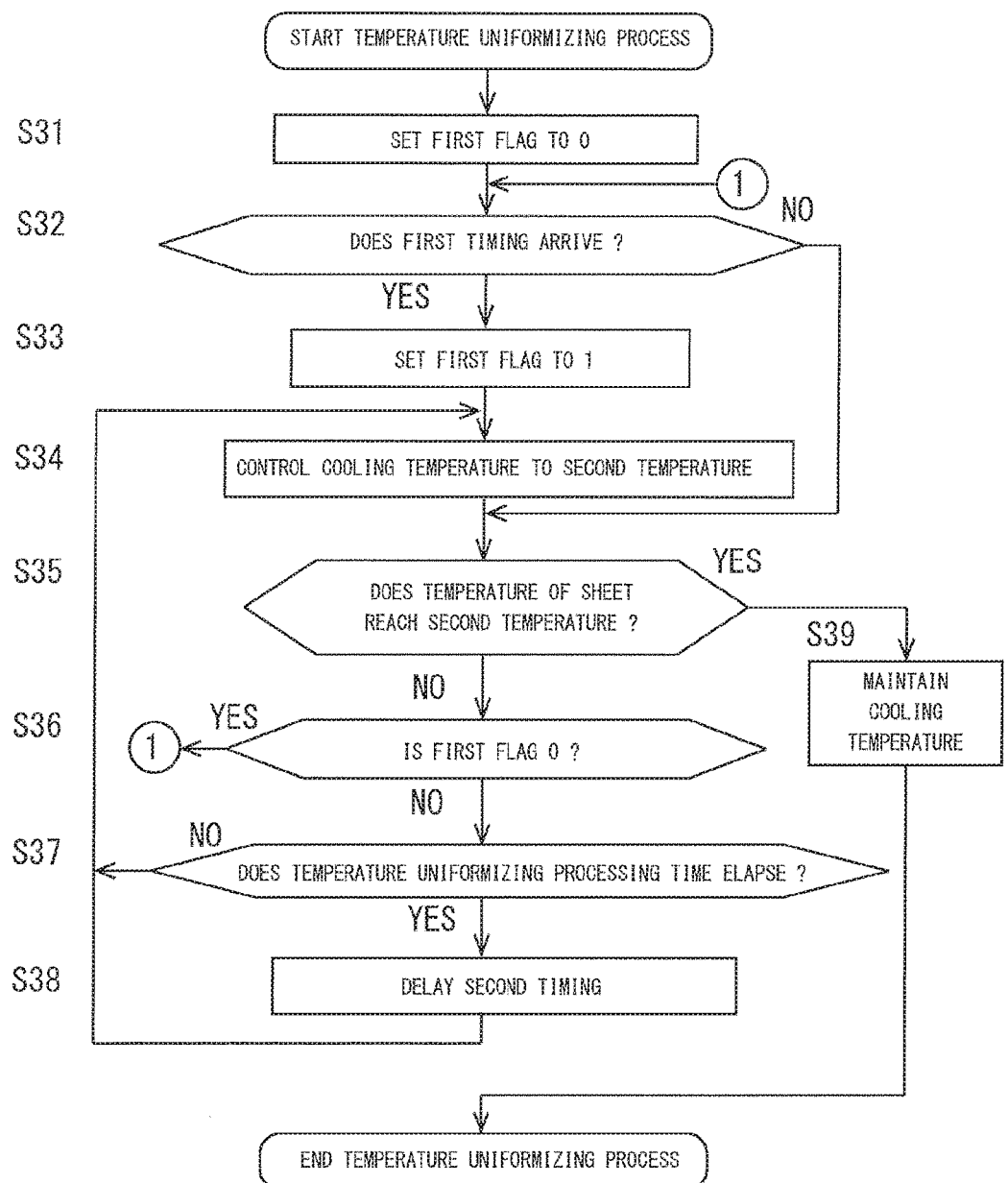
FIG. 14 is a flow chart for showing a temperature uniformizing process.

Next, the process in step S15 will be specifically explained. FIG. 14 is a flow chart for showing a temperature uniformizing process.

In step S31, the temperature control unit 111 sets a first flag to zero. In step S32, the temperature control unit 111 determines whether or not the first timing E arrives. If the first timing E arrives (step S32: YES), the first flag is set to 1. Conversely, if the first timing E does not arrives (step S32: NO), the process proceeds to step S35.

In step S33, the temperature control unit 111 sets the first flag to 1. In step S34, the temperature control unit 111 controls the cooling temperature to the second temperature.

In step S35, the temperature control unit 111 determines whether or not the temperature of a sheet P reaches the second temperature. If the temperature of the sheet P reaches the second temperature (step S35:YES), the process proceeds to step S39. Conversely, if the temperature of the sheet P does not reach the second temperature (step S35:NO), the process proceeds to step S36.

In step S36, the temperature control unit 111 determines whether or not the first flag is zero. If the first flag is zero (step S36: YES), the process is returned to step S32. Conversely, if the first flag is not zero (step S36: NO), the process proceeds to step S37.

In step S37, the temperature control unit 111 determines whether or not the temperature uniformizing processing time G elapses. If the temperature uniformizing processing time G elapses (step S37: YES), the process proceeds to step S38. Conversely, if the temperature uniformizing processing time G does not elapse (step S37: NO), the process is returned to step S34.

In step S38, the temperature control unit 111 delays the second timing F, and the process is returned to step S34.

As has been discussed above, when the image correction process is performed to obtain the correction amount of an image printed on a sheet P, the image reading apparatus 7 controls the cooling temperature to a target temperature at which the temperature condition of the sheet P is shifted to a uniform condition. By this process, the temperature distribution of the sheet P becomes uniform. After making the temperature distribution of the sheet P uniform, the image reading apparatus 7 has the scanner 100 read the sheet P, and the colorimeter 103 colorimetrically measure the sheet P. Since the temperature distribution of the sheet P is uniform, the scanner 100 can read the color of an image printed on the sheet P without color tone deformation due to thermochromism.

Accordingly, the image reading apparatus 7 can detect correct color tones of the image printed on the sheet P by controlling the cooling temperature of the cooling device 145, which cools the scanner 100, to a temperature suitable for making the temperature of the sheet P uniform and improving the unevenness of the temperature distribution of the sheet P.

Also, the scanner 100 can read the entirety of a sheet P by repeating line read operation along the entire width direction while conveying the sheet P. By this process, when reading a sheet P, the scanner 100 reads the position and magnification factor of the sheet P in addition to the color of the image of the sheet P. On the other hand, the colorimeter 103 has a narrower range of reading a sheet P but a higher accuracy of measuring the color of the sheet P than the scanner 100. The image reading apparatus 7 can thereby feed back an accurate correction amount of an image to the image forming apparatus 5 by obtaining the correction amount based on the reading result of the scanner 100 and the colorimetric measurement result of the colorimeter 103.

Accordingly, the image reading apparatus 7 improves the accuracy of the reading result of a sheet P by the scanner 100 by detecting the correct color tones of the image printed on the sheet P, and therefore can improve the accuracy of the correction amount of the image generated by the scanner 100 and the colorimeter 103. Namely, when the correction amount of the image forming apparatus 5 is fed back from the image reading apparatus 7, the correction amount which is fed back is calculated based on the colorimetric measurement result of the colorimeter 103 and the reading result of the scanner 100 which is not influenced by color tone deviation, and therefore the reliability of the correction amount which is fed back can be improved. Accordingly, in the case where the continuous print process is performed for business use, the reproducibility of the color of an image printed on a sheet P can be improved so that the yield of printed sheets can be improved.

Also, when a predetermined threshold number of sheets P are printed during performing the image correction process, the image reading apparatus 7 controls the temperature distribution of a sheet P to be uniform. In other words, when the number of sheets to be continuously printed is small, there is little possibility that the temperature distribution of a sheet P becomes uneven, and thereby the temperature distribution of a sheet P may be uniformly controlled only when the temperature distribution of the sheet P is uneven. The operation of cooling the scanner 100 is given priority when there is little possibility that the temperature distribution of a sheet P becomes uneven, so that the illumination variation can be continuously inhibited.

Also, the image reading apparatus 7 controls the blowing amount for making the temperature distribution of a sheet P uniform to be weaker than the blowing amount for cooling the scanner 100 so that, when performing the image correction process, the thermal imbalance between the edge areas B of the sheet P and the center area C of the sheet P can be lessened by reducing the influence of uneven temperature distribution due to air blow to promote thermal diffusion caused by the temperature gradient.

Furthermore, when the image correction process is performed, the image reading apparatus 7 decreases the blowing amount for cooling the scanner 100 only in the temperature uniformizing processing time G for making the temperature distribution of a sheet P uniform. Accordingly, since the temperature uniformizing processing time G is set up by taking into consideration a temperature rising rate during using the scanner 100, the image reading apparatus 7 can terminate the process of making the temperature distribution of a sheet P uniform before the luminance becomes unstable.

Also, if the temperature of a sheet P does not become uniform even if the temperature uniformizing processing time G has elapsed, the image reading apparatus 7 delays the timing with which the temperature uniformizing processing time G is terminated. Namely, since priority is given to the process of making the temperature distribution of a sheet P uniform, priority can be given to the process of obtaining an appropriate correction amount of an image. However, extension of the temperature uniformizing processing time G is within the acceptable range of luminance variation.

The image reading apparatus 7 controls the blowing amount of air supplied to the heat sink 143 by controlling the rotational speed of the fan 151. It is therefore possible to effectively perform switching control between the operation of cooling the scanner 100 and the operation for making the temperature distribution of a sheet P uniform.

Also, in the case where the paper density of a sheet P is larger than a predetermined threshold value, while the image correction process is not performed, the image reading apparatus 7 increases the rotational speed of the fan 151 to be greater than the rotational speed during usual cooling operation. By this process, even if a sheet P has a large thermal capacity such as a sheet P having a large paper density, the scanner 100 can be cooled to no higher than a predetermined temperature by further increasing the rotational speed of the fan 151.

Also, in the case where a sheet P is coated with a coating material, while the image correction process is not performed, the image reading apparatus 7 increases the rotational speed of the fan 151 to be greater than the rotational speed during usual cooling operation. By this process, even if a sheet P has a large thermal capacity such as a coated paper coated with a coating material, the scanner 100 can be cooled to no higher than a predetermined temperature by further increasing the rotational speed of the fan 151.

Furthermore, in the case where the water content of a sheet P is larger than a predetermined threshold value, while the image correction process is not performed, the image reading apparatus 7 increases the rotational speed of the fan 151 to be greater than the rotational speed during usual cooling operation. By this process, even if a sheet P has a large thermal capacity such as a paper P having a large water content, the scanner 100 can be cooled to no higher than a predetermined temperature by further increasing the rotational speed of the fan 151.

Also, when cooling the scanner 100, the image reading apparatus 7 can control the rotational speed of the fan 151 in a stepwise manner or a continuous manner in accordance with the characteristics of the fan 151. For example, in the case where the blowing amount of the fan 151 can be adjusted in three steps, i.e., strong, medium and weak, an appropriate setting can be determined such as strong for 5000th to 10000th sheets, medium for 1000th to 5000th sheets, and weak for 1st to 1000th sheets.

Also, the image reading apparatus 7 may halt the rotation of the fan 151 in order to make the temperature distribution of the sheet P uniform so that no cooling air blows on a sheet P. Thermal diffusion is thereby caused by a temperature gradient to improve the uneven temperature distribution of the sheet P. In addition to this, when the rotation of the fan 151 is halted, the vibration of the fan 151 is not transmitted to the scanner 100 so that the reading accuracy of the scanner 100 can be improved.

As has been discussed above, the image reading apparatus 7 of the present embodiment comprises: the scanner 100 structured to read a sheet P on which an image is printed; the colorimeter 103 located in a downstream side of the scanner 100 and structured to colorimetrically measure the sheet P; the cooling device 145 structured to cool the scanner 100; the temperature control unit 111 structured to control a cooling temperature of the cooling device 145 to a target temperature; and the image correction unit 113 structured to perform an image correction process for obtaining a correction amount of the image printed on the sheet P, wherein the temperature control unit 111 is structured to control, while the image correction process is not performed, the cooling temperature to a first temperature which is a target value of the cooling temperature for shifting the cooling device 145 to a predetermined cooled state, and control, while the image correction process is performed, the cooling temperature to a second temperature which is a target value of the cooling temperature for making the temperature of the sheet P uniform, and wherein the image correction unit 113 is structured to obtain, while the temperature control unit 111 controls the cooling temperature to the second temperature, the correction amount of the image based on the colorimetric measurement result of the colorimeter 103 and the reading result of the scanner 100.

The image reading apparatus 7 can thereby detect correct color tones of the image printed on the sheet P by controlling the cooling temperature of the cooling device 145, which cools the scanner 100, to a temperature suitable for making the temperature of the sheet P uniform and improving the unevenness of the temperature distribution of the sheet P.

Also, in accordance with the image reading apparatus 7 of the present embodiment, when a predetermined threshold number of sheets P are printed during performing the image correction process, the temperature control unit 111 controls the cooling temperature to the second temperature.

By this configuration, the image reading apparatus 7 can give priority to the operation of cooling the scanner 100 when there is little possibility that the temperature distribution of a sheet P becomes uneven, so that the illumination variation can be continuously inhibited.

Furthermore, in accordance with the image reading apparatus 7 of the present embodiment, the cooling device 145 is provided with the fan 151 which controls the blowing amount of air, and the temperature control unit 111 controls the blowing amount of air to the first blowing amount for controlling the cooling temperature to the first temperature and controls the blowing amount of air to the second blowing amount which is smaller than the first blowing amount for controlling the cooling temperature to the second temperature.

By this configuration, when the image correction process is performed, the image reading apparatus 7 can improve the thermal imbalance between the edge areas B of the sheet P and the center area C of the sheet P.

Furthermore, in accordance with the image reading apparatus 7 of the present embodiment, when controlling the cooling temperature to the second temperature, the temperature control unit 111 uses the first timing E to start the controlling and the second timing F to terminate the controlling, and when the image correction process is performed, the temperature control unit 111 controls the blowing amount of air to the second blowing amount in a temperature uniformizing processing time G from the first timing E to the second timing F around the colorimetrically measurement timing D of the colorimeter 103.

Accordingly, since the temperature uniformizing processing time G is set up by taking into consideration a temperature rising rate during using the scanner 100, the image reading apparatus 7 can terminate the process of making the temperature distribution of a sheet P uniform before the luminance becomes unstable.

Furthermore, in accordance with the image reading apparatus 7 of the present embodiment which is provided further with the temperature detection sensor 107 for detecting the temperature of a sheet P, when the temperature detected by the temperature detection sensor 107 reaches the second temperature with the first timing E, the temperature control unit 111 maintains the current cooling temperature, and when the temperature detected by the temperature detection sensor 107 does not reach the second temperature after elapsing the temperature uniformizing processing time G, the temperature control unit 111 delays the second timing F.

Namely, since the image reading apparatus 7 gives priority to the process of making the temperature distribution of a sheet P uniform, priority can be given to the process of obtaining an appropriate correction amount of an image.

Furthermore, in accordance with the image reading apparatus 7 of the present embodiment, the scanner 100 is provided with the imaging device 122 structured to image a sheet P along the width direction of the sheet P, the point light sources 131 structured to irradiate the sheet P with light when the imaging device 122 images the sheet P, the control board 141 structured to control the light quantity of light emitted from the point light source 131, and the heat sink 143 arranged on the control board 141 and structured to release heat generated by the control board 141. The cooling device 145 supplies air to the heat sink 143. When controlling the cooling temperature to the first temperature, the temperature control unit 111 increases the rotational speed of the fan 151 to the first rotational speed, and when controlling the cooling temperature to the second temperature, the temperature control unit 111 decreases the rotational speed of the fan 151 to the second rotational speed which is lower than the first rotational speed.

By this configuration, the image reading apparatus 7 can effectively perform switching control between the operation of cooling the scanner 100 and the operation for making the temperature distribution of a sheet P uniform by controlling the rotational speed of the fan 151.

Also, in accordance with the image reading apparatus 7 of the present embodiment, when a sheet P having a paper density larger than a predetermined threshold value is passed while the image correction process is not performed, the temperature control unit 111 increases the rotational speed of the fan 151 to a third rotational speed which is greater than the first rotational speed.

By this process, even if a sheet P has a large thermal capacity such as a sheet P having a large paper density, the image reading apparatus 7 can cool the scanner 100 to no higher than a predetermined temperature by further increasing the rotational speed of the fan 151.

Furthermore, in accordance with the image reading apparatus 7 of the present embodiment, when a sheet P coated with a coating material is passed while the image correction process is not performed, the temperature control unit 111 increases the rotational speed of the fan 151 to a third rotational speed which is greater than the first rotational speed.

By this process, even if a sheet P has a large thermal capacity such as a coated paper coated with a coating material, the image reading apparatus 7 can cool the scanner 100 to no higher than a predetermined temperature by further increasing the rotational speed of the fan 151.

Still further, in accordance with the image reading apparatus 7 of the present embodiment, when a sheet P having a water content larger than a predetermined threshold value is passed while the image correction process is not performed, the temperature control unit 111 increases the rotational speed of the fan 151 to a third rotational speed which is greater than the first rotational speed.

By this process, even if a sheet P has a large thermal capacity such as a paper P having a large water content, the image reading apparatus 7 can cool the scanner 100 no higher than a predetermined temperature by further increasing the rotational speed of the fan 151.

Still further, in accordance with the image reading apparatus 7 of the present embodiment, the first blowing amount setting includes controlling the rotational speed of the fans 151 in a stepwise manner or a continuous manner, and the second blowing amount setting includes halting the rotation of the fans 151.

In the case of the image reading apparatus 7, when the rotation of the fan 151 is halted in order to make the temperature distribution of a sheet P uniform so that no cooling air blows on the sheet P, thermal diffusion is thereby caused by a temperature gradient to improve the uneven temperature distribution of the sheet P. In addition to this, when the rotation of the fan 151 is halted, the vibration of the fan 151 is not transmitted to the scanner 100 so that the reading accuracy of the scanner 100 can be improved.

Incidentally, the image forming system 1 of the present embodiment includes the image reading apparatus 7.

Namely, in the case of the image forming system 1, when the correction amount of the image forming apparatus 5 is fed back from the image reading apparatus 7, the correction amount which is fed back is calculated based on the colorimetric measurement result of the colorimeter 103 and the reading result of the scanner 100 which is not influenced by color tone deviation, and therefore the reliability of the correction amount which is fed back can be improved.

Embodiment 2

In this embodiment 2, similar elements are given similar references as in the embodiment 1, and therefore no redundant description is repeated. As described below, this embodiment 2 differs from the embodiment 1 in that ducts 153 are arranged to blow out air from fans 151 in a different direction.

Figure 15:
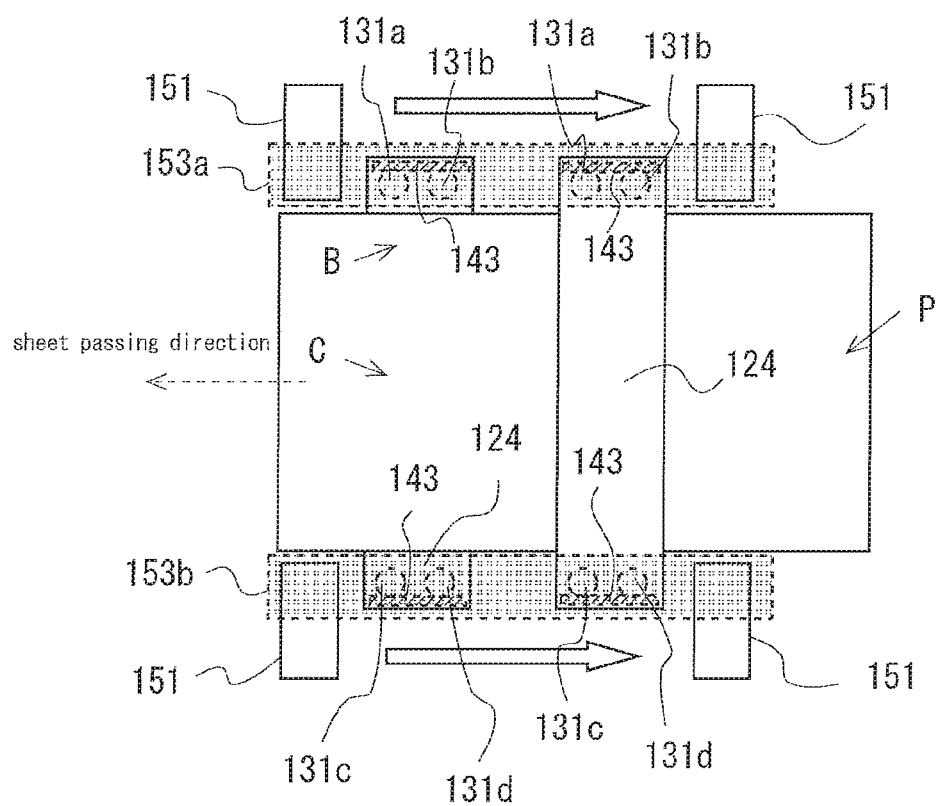
FIG. 15 is a view for schematically showing the situation in which a cooling air is prevented from blowing on a sheet P by ducts 153a and 153b of an embodiment 2.

FIG. 15 is a view for schematically showing the situation in which a cooling air is prevented from blowing on a sheet P by ducts 153a and 153b of the embodiment 2. Namely, as illustrated in FIG. 15, the ducts 153a and 153b are installed in order to lead air to the heat sinks 143. The fans 151 are arranged in order to produce an air flow along the ducts 153a and 153b respectively. The duct 153a is arranged in order to send air from the fans 151 to point light sources 131a and 131b located in this duct without leaking air to the outside. The duct 153b is arranged in order to send air from the fans 151 to point light sources 131c and 131d located in this duct without leaking air to the outside. Accordingly, the ducts 153a and 153b serve also as means for heat insulation.

Incidentally, the ducts 153a and 153b are referred to simply as the duct 153 when they need not be distinguished.

As described above, in the image reading apparatus 7 provided with the duct 153 which leads air from the fan 151 to the heat sink 143, the air propelled from the fan 151 does not blow on a sheet P. The temperature distribution of a sheet P does thereby not become uneven due to the rotation of the fan 151, so that it is possible to performs the image correction process for correctly detecting color tones at any time.

Namely, the image reading apparatus 7 of the present embodiment is provided further with the ducts 153 for leading air to the heat sinks 143.

The temperature distribution of a sheet P does thereby not become uneven due to the rotation of the fan 151, so that the image reading apparatus 7 can performs the image correction process for correctly detecting color tones at any time.

Embodiment 3

In this embodiment 3, similar elements are given similar references as in the embodiments 1 and 2, and therefore no redundant description is repeated. As described below, this embodiment 3 differs from the embodiments 1 and 2 in that blocking members 155 are provided.

Figure 16:
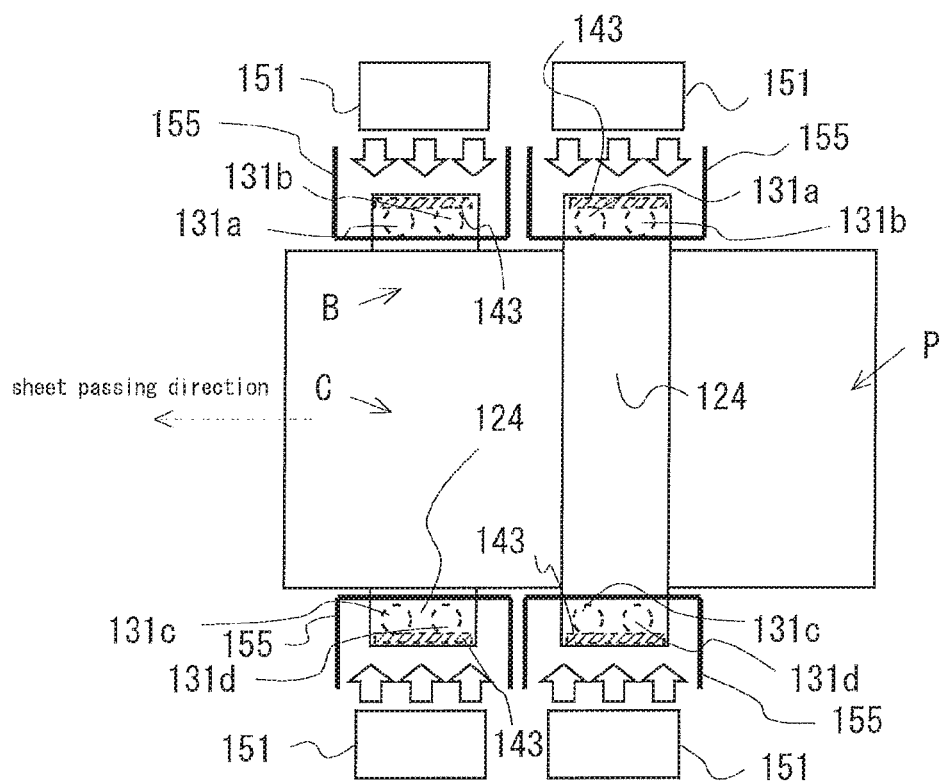
FIG. 16 is a view for schematically showing the situation in which a cooling air is prevented from blowing on a sheet P by blocking members 155 of an embodiment 3.

FIG. 16 is a view for schematically showing the situation in which a cooling air is prevented from blowing on a sheet P by the blocking members 155 of the embodiment 3. Namely, as illustrated in FIG. 16, the blocking member 155 is provided between the fan 151 and the heat sink 143 to cover the periphery of the heat sink 143 and prevent heat from being transmitted to a sheet P. The blocking member 155 blocks air propelled from the fan 151 before the air reaches a sheet P.

As described above, in the image reading apparatus 7 provided with the blocking member 155 between the fan 151 and the heat sink 143, the air propelled from the fan 151 does not blow on a sheet P. The temperature distribution of a sheet P does thereby not become uneven due to the rotation of the fan 151, so that it is possible to performs the image correction process for correctly detecting color tones at any time.

Namely, the image reading apparatus 7 of the present embodiment is provided further with the blocking member 155 between the fan 151 and the heat sink 143 to cover the periphery of the heat sink 143 and prevent heat from being transmitted to a sheet P.

In accordance with the image reading apparatus 7, the temperature distribution of a sheet P does thereby not become uneven due to the rotation of the fan 151 so that no temperature gradient is formed on the sheet P, and therefore it is possible to performs the image correction process for correctly detecting color tones at any time.

Embodiment 4

In this embodiment 4, similar elements are given similar references as in the embodiments 1 through 3, and therefore no redundant description is repeated. As described below, this embodiment 4 differs from the embodiments 1 through 3 in that a pump 157 and a conduit 158 are provided in place of the fan 151.

Figure 17:
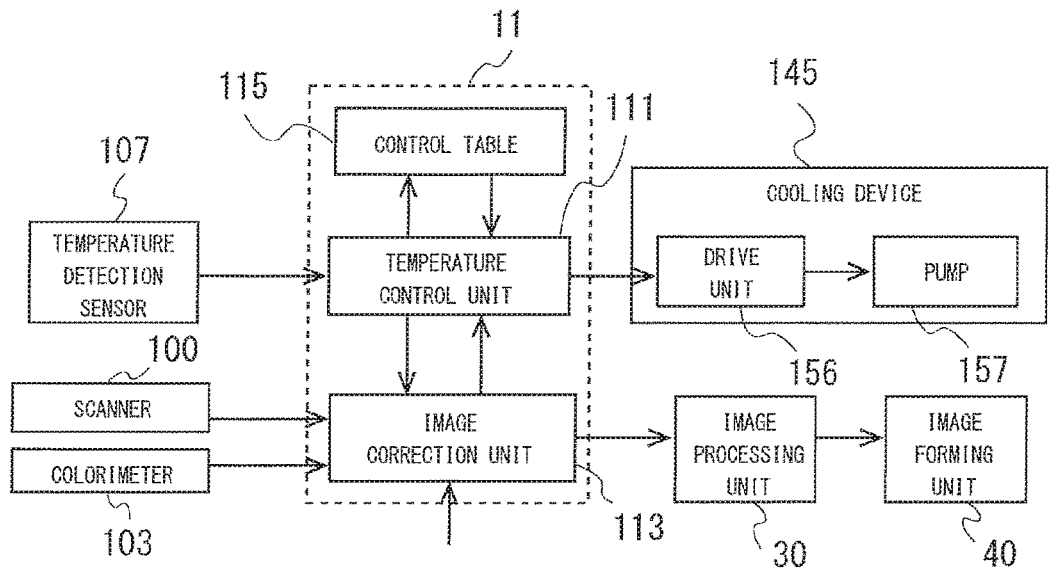
FIG. 17 is a block diagram for showing the functional configuration of the control unit 11 and the cooling device 145 in accordance with an embodiment 4.

FIG. 17 is a block diagram for showing the functional configuration of the control unit 11 and the cooling device 145 in accordance with the embodiment 4. As illustrated in FIG. 17, the cooling device 145 is provided with a drive unit 156 and the pump 157. The drive unit 156 is responsible for controlling the operation of the pump 157. The pump 157 circulates a heat medium. The temperature control unit 111 transmits a control command to the drive unit 156 to control the flow rate of the heat medium through the pump 157 and control the temperature of the heat medium to a target temperature.

Figure 18:
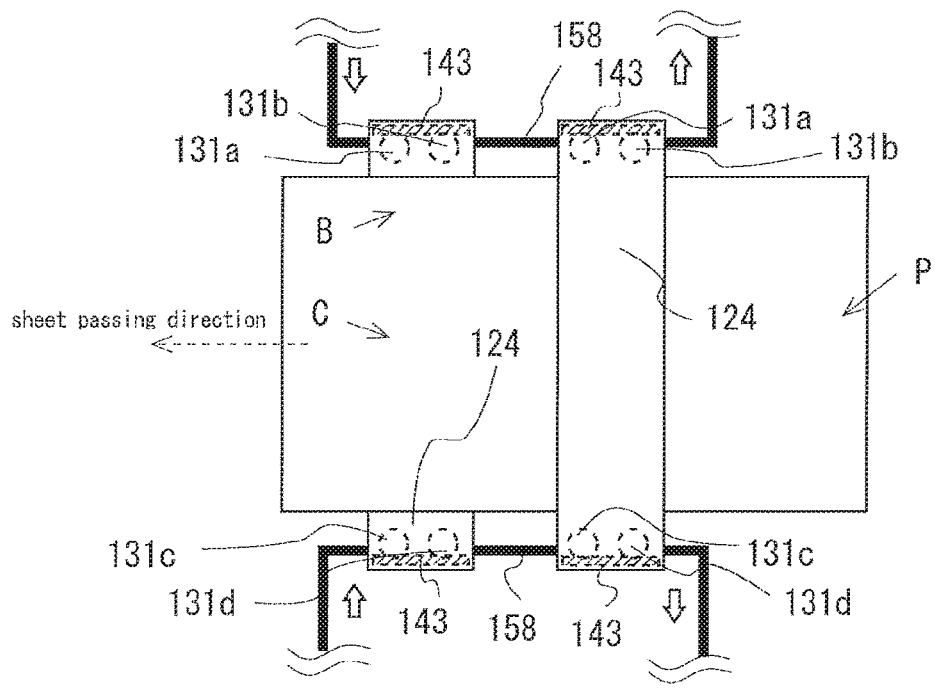
FIG. 18 is a view for schematically showing the situation in which a sheet P is not cooled by performing heat exchange between a conduit 158 and a heat sink 143.

FIG. 18 is a view for schematically showing the situation in which a sheet P is not cooled by performing heat exchange between the conduit 158 and the heat sink 143. As illustrated in FIG. 18, the conduit 158 is located in a position opposite the heat sink 143. The conduit 158 is provided for circulating the heat medium consisting of a coolant or water. Heat released from the heat sink 143 is transferred to the heat medium by circulating the heat medium in the conduit 158. A sheet P is thereby not cooled so that no temperature gradient occurs in the sheet P.

As has been discussed above, in accordance with the image reading apparatus 7, the conduit 158 through which the heat medium flows is located in a position opposite the heat sink 143 so that heat exchange occurs between the heat medium and the heat sink 143, and thereby there is no factor causing unevenness in the temperature distribution of the sheet P. The temperature distribution of a sheet P does thereby not become uneven so that no temperature gradient is formed on the sheet P, and therefore it is possible to performs the image correction process for correctly detecting color tones at any time.

Accordingly, in accordance with the image reading apparatus 7 of the present embodiment, the scanner 100 is provided with the imaging device 122 structured to image a sheet P along the width direction of the sheet P, the point light sources 131 structured to irradiate the sheet P with light when the imaging device 122 images the sheet P, the control board 141 structured to control the light quantity of light emitted from the point light source 131, and the heat sink 143 arranged on the control board 141 and structured to release heat generated by the control board 141. Further-more, the conduit 158 is located in a position opposite the heat sink 143 for passing the heat medium consisting of a coolant or water. The cooling device 146 is provided with the pump 157 for circulating the heat medium. The temperature control unit 111 controls the flow rate of the heat medium by the pump 157 to control the temperature of the heat medium to a target temperature.

By this configuration, in accordance with the image reading apparatus 7, heat released from the heat sink 143 is transferred to the heat medium and thereby there is no factor causing unevenness in the temperature distribution of the sheet P. The temperature distribution of a sheet P does thereby not become uneven so that no temperature gradient is formed on the sheet P, and therefore it is possible to performs the image correction process for correctly detecting color tones at any time.

The image reading apparatus 7 have been explained based on the embodiments in accordance with the present invention. However, it is not intended to limit the present invention to the precise form described, and obviously many modifications and variations are possible without departing from the scope of the invention.

For example, while an in-line system is used in the image reading apparatus 7 of the present embodiment, the present invention is not limited thereto but can be applied to an offline system.

Also, while the above example provided with the scanners 100a and 100b is explained, the present invention is not limited to this structure but applicable to the case where only either one of the scanner 100a and the scanner 100b is provided. Incidentally, in the case where only either one of the scanner 100a and the scanner 100b is provided, there is provided a conveying route 50 on which a sheet P is reversed and circulated.

Also, while the imaging device 122 consists of CCDs in the above example, the present invention is not limited to this structure but the imaging device may consist of CMOSs.

Furthermore, while the lighting system 124 consists of a CCD line sensor as a CIS line sensor in the above example, the present invention is not limited to this structure but a CMOS line sensor can be used instead.

Still further, while the scanner 100a and the scanner 100b are arranged in order that the back side of a sheet P is read in the upstream side and that the front side of the sheet P is read in the downstream side in the above example, the present invention is not limited to this structure, but the scanner 100a and the scanner 100b and the calibration member 105a and the calibration member 105b can be arranged in order that the front side of a sheet P is read in the upstream side and that the back side of the sheet P is read in the downstream side in the above example.

Still further, while the heat medium circulating through the conduit 158 is controlled by the pump 157 in the above example, the present invention is not limited to this structure, but a refrigerating circuit can be used to circulate the heat medium while repeating compression and expansion of the heat medium in the form of a refrigerating cycle in order to perform heat exchange between the heat sink 143 and the heat medium.

What is claimed is:
1. An image reading apparatus comprising:
   a scanner structured to read a sheet on which an image is printed;
   a colorimeter located in a downstream side of the scanner and structured to colorimetrically measure the sheet;
   a cooling device structured to cool the scanner;

a temperature control unit structured to control a cooling temperature of the cooling device to a target temperature; and an image correction unit structured to perform an image correction process for obtaining a correction amount of the image printed on the sheet, wherein the temperature control unit is structured to control, while the image correction process is not performed, the cooling temperature to a first temperature which is a target value of the cooling temperature for shifting the cooling device to a predetermined cooled state, and control, while the image correction process is performed, the cooling temperature to a second temperature which is a target value of the cooling temperature for making the temperature of the sheet uniform, and wherein the image correction unit is structured to obtain, while the temperature control unit controls the cooling temperature to the second temperature, the correction amount of the image based on the colorimetric measurement result of the colorimeter and the reading result of the scanner.

2. The image reading apparatus of claim 1 wherein when a predetermined threshold number of sheets are printed during performing the image correction process, the temperature control unit controls the cooling temperature to the second temperature.

3. The image reading apparatus of claim 2 wherein the cooling device is provided with a fan which controls a blowing amount of air, and wherein the temperature control unit controls the blowing amount of air to a first blowing amount for controlling the cooling temperature to the first temperature and controls the blowing amount of air to a second blowing amount which is smaller than the first blowing amount for controlling the cooling temperature to the second temperature.

4. The image reading apparatus of claim 3 wherein when controlling the cooling temperature to the second temperature, the temperature control unit uses a first timing to start the controlling and a second timing to terminate the controlling, and wherein the temperature control unit controls the blowing amount of air to the second blowing amount in a temperature uniformizing processing time from the first timing to the second timing around a colorimetrically measurement timing of the colorimeter.

5. The image reading apparatus of claim 4 further comprising:

a temperature detection sensor structured to detect a temperature of the sheet, wherein when the temperature detected by the temperature detection sensor reaches the second temperature with the first timing, the temperature control unit maintains the current cooling temperature, and wherein when the temperature detected by the temperature detection sensor does not reach the second temperature after elapsing the temperature uniformizing processing time, the temperature control unit delays the second timing.

6. The image reading apparatus of claim 5 wherein the scanner comprises:

an imaging device structured to image the sheet along the width direction of the sheet;

a point light source structured to irradiate the sheet with light when the imaging device images the sheet;

a control board structured to control a light quantity of light emitted from the point light source; and a heat sink arranged on the control board and structured to release heat generated by the control board, wherein the cooling device supplies air to the heat sink, wherein when controlling the cooling temperature to the first temperature, the temperature control unit increases a rotational speed of the fan to a first rotational speed, and wherein when controlling the cooling temperature to the second temperature, the temperature control unit decreases the rotational speed of the fan to a second rotational speed which is lower than the first rotational speed.

7. The image reading apparatus of claim 6 wherein when a sheet having a paper density larger than a predetermined threshold value is passed while the image correction process is not performed, the temperature control unit increases the rotational speed of the fan to a third rotational speed which is higher than the first rotational speed.

8. The image reading apparatus of claim 6 wherein when a sheet coated with a coating material is passed while the image correction process is not performed, the temperature control unit increases the rotational speed of the fan to a third rotational speed which is higher than the first rotational speed.

9. The image reading apparatus of claim 6 wherein when a sheet having a water content larger than a predetermined threshold value is passed while the image correction process is not performed, the temperature control unit increases the rotational speed of the fan to a third rotational speed which is higher than the first rotational speed.

10. The image reading apparatus of claim 6 further comprising a duct structured to lead the air to the heat sink.

11. The image reading apparatus of claim 2 further comprising a blocking member provided between the fan and the heat sink to cover the periphery of the heat sink and block heat from being transmitted to the sheet.

12. The image reading apparatus of claim 3 wherein the blowing amount is controlled to the first blowing amount in a stepwise manner or a continuous manner, and wherein the blowing amount is controlled to the second blowing amount by halting the rotation of the fans.

13. The image reading apparatus of claim 2 wherein the scanner comprises:

an imaging device structured to image the sheet along the width direction of the sheet;

a point light source structured to irradiate the sheet with light when the imaging device images the sheet;

a control board structured to control a light quantity of light emitted from the point light source; and a heat sink arranged on the control board and structured to release heat generated by the control board, wherein the scanner further comprises a conduit for passing the heat medium which consists of a coolant or water, wherein the cooling device comprises a pump for circulating the heat medium, and wherein the temperature control unit has the pump control a flow rate of the heat medium and control the temperature of the heat medium to a target temperature.

14. An image forming system including the image reading apparatus as recited in claim 1.

* * * * *